(12) United States Patent
She et al.

(10) Patent No.: US 7,317,795 B2
(45) Date of Patent: Jan. 8, 2008

(54) PIPELINED DECIPHERING ROUND KEYS GENERATION

(76) Inventors: Alfred C. She, 8540 SW. Wakkila Ter., Beaverton, OR (US) 97007; James L. Gimlett, 15548 SW. Peachtree Dr., Tigard, OR (US) 97224

( * ) Notice: Subject to any disclaimer, the term of this patent is extended or adjusted under 35 U.S.C. 154(b) by 642 days.

(21) Appl. No.: 09/836,965

(22) Filed: Apr. 17, 2001

(65) Prior Publication Data
US 2002/0159589 A1    Oct. 31, 2002

(51) Int. Cl.
*H04K 1/06* (2006.01)

(52) U.S. Cl. .............................. 380/37; 380/42; 380/44

(58) Field of Classification Search ................ 713/151, 713/150; 380/49, 29–30, 21, 37, 44, 42
See application file for complete search history.

(56) References Cited

U.S. PATENT DOCUMENTS

| | | | | |
|---|---|---|---|---|
| 4,255,811 A | * | 3/1981 | Adler | 380/37 |
| 5,159,633 A | * | 10/1992 | Nakamura | 380/30 |
| 5,161,193 A | * | 11/1992 | Lampson et al. | 713/151 |
| 5,638,444 A | * | 6/1997 | Chou et al. | 380/284 |
| 6,044,388 A | * | 3/2000 | DeBellis et al. | 708/254 |
| 6,052,466 A | * | 4/2000 | Wright | 380/262 |
| 6,182,216 B1 | | 1/2001 | Luyster | |
| 6,192,129 B1 | | 2/2001 | Coppersmith et al. | |

\* cited by examiner

*Primary Examiner*—T. B. Truong
(74) *Attorney, Agent, or Firm*—Berkeley Law & Technology Group

(57) ABSTRACT

An apparatus is equipped with a deciphering round key generator to successively generate in real time at least a first and a second deciphering round key based on a deciphering key, and a deciphering unit coupled to the deciphering round key generator to successively employ the real time successively generated deciphering round keys to incrementally decipher a ciphered text. The deciphering round key generator at least generates the second deciphering round key in real time while the deciphering unit deciphers the ciphered text employing the real time generated first deciphering round key. As a result, deciphering round keys may be generated in a much more efficient manner on an as needed basis.

31 Claims, 6 Drawing Sheets

Figure 1

Cipher ~ 106

Decipher ~ 108

"Constant" Value Table ~ 500

| "Iteration" Value ~ 502 | "Constant" Values ~ 504 |
|---|---|
| J = Floor (i/Nk) | $z^{j-1}$, 00, 00, 00 |
| | |
| | |
| | |
| | |

PIPELINED DECIPHERING ROUND KEYS GENERATION

BACKGROUND OF THE INVENTION

1. Field of the Invention

The present invention relates to the field of ciphering and deciphering. More specifically, the present invention relates to line rate deciphering having special application in network traffic routing.

2. Background Information

With advances in integrated circuit, microprocessor, networking and communication technologies, increasing number of devices, in particular, digital computing devices, are being networked together. Devices are often first coupled to a local area network, such as an Ethernet based office/home network. In turn, the local area networks are interconnected together through wide area networks, such as ATM networks, Frame Relays, and the like. Of particular notoriety is the TCP/IP based global inter-networks, Internet.

As a result of this trend of increased connectivity, increasing number of applications that are network dependent are being deployed. Examples of these network dependent applications include but are not limited to, email, net based telephony, world wide web and various types of e-commerce. Successes of many of these content/service providers as well as commerce sites depend on high speed delivery of a large volume of data.

At the same time, with increased concern over privacy and security, increasing amount of data are being transferred in a ciphered basis. As a result, successes of the content/service providers as well as commerce sites are also dependent on the routing devices, as well as the servers and client devices being able to cipher and decipher data at a very high rate.

The fundamentals of ciphering and deciphering are well known in the art. Typically, a plain text is ciphered using a ciphering "master" key. The ciphering is effectuated incrementally over a number of iterations, employing a number of corresponding ciphering round keys. The ciphering round keys are generated from the ciphering "master" key using a round function, with the first ciphering round key generated directly from the ciphering "master" key and thereafter, each subsequent ciphering round key, from the immediately preceding ciphering round key, the original "master" key plus one or more pseudo random factors or other algorithmic approaches. The ciphered text is deciphered by applying the ciphering round keys backward. In other words, the first deciphering round key is the last ciphering round key.

The emphasis under the prior art to-date typically has been on the robustness of ciphering, that is, ensuring it is difficult for any attacker to uncover the deciphering round keys. Generally, the "undetectability" of the ciphering/deciphering round keys are enhanced by increasing the pseudo randomness injected between successive rounds of ciphering. As a result, if a deciphering unit, or a unit responsible for providing the deciphering unit with the deciphering round keys, is required to generate the deciphering round keys (e.g. in symmetric ciphering/deciphering), the deciphering round keys are fully generated (by re-generating the ciphering round keys in the conventional forward manner), before deciphering can take place (applying the re-generated ciphering round keys in reverse order as deciphering round keys).

The prior art approach of having the deciphering round keys fully generated is inefficient. In addition to having to wait for the generation of the last ciphering round key before deciphering can take place, the amount of storage elements required to generate and hold all the deciphering round keys could be significant, especially for deciphering/deciphering processes that employ long ciphering/deciphering round keys and/or great numbers of rounds. The delay in the start of deciphering and the large amount of storage required are especially problematic for high speed applications that require high line rate deciphering for multiple data streams at the same time, such as high speed optical networking, where multiple network traffic flows often have to be deciphered substantially at the same time. The reason being, the desired high line rate deciphering typically means that all the deciphering has to be performed on-chip in parallel. However, the large memory requirement, and the resulting substantial IC real estate consumption render these prior art approaches less than desirable.

Thus, a more efficient approach to deciphering, in particular, deciphering round key generation is desired.

SUMMARY OF THE INVENTION

An apparatus is equipped with a deciphering round key generator to successively generate in real time at least a first and a second deciphering round key based on a deciphering key, and a deciphering unit coupled to the deciphering round key generator to successively employ the real time successively generated deciphering round keys to incrementally decipher a ciphered text. The deciphering round key generator at least generates the second deciphering round key in real time while the deciphering unit deciphers the ciphered text employing the real time generated first deciphering round key.

In one embodiment, the deciphering round key generator generates the second deciphering round key in real time by iteratively generating its data words over a plurality of iterations. In one embodiment, the deciphering round key generator includes a first XOR function, and iteratively generates the data words of the second round key over a plurality of iterations by generating one data word each iteration, performing an XOR operation on a first and a second round key data word using the first XOR function.

In one embodiment, the first round key data word employed in each iteration is a first predecessor round key data word of the first plurality of round key data words of one deciphering master key length preceding the round key data word to be generated, and the second round key data word employed is a conditionally transformed version of a second predecessor round key data word immediately following the first predecessor round key data word (in terms of their orders of regeneration).

In one embodiment, the conditional transformation includes outputting the "immediately following" predecessor round key data word without further processing, or further processing it before outputting the "immediately following" predecessor round key data word as the transformed version. The further processing conditionally includes one or more of rotational shifting, inverse computation, substitution, or another XOR operation.

In one embodiment, the apparatus includes multiple ones of the deciphering round key generators, and multiple ones of the deciphering units, to generate multiple series of deciphering round keys in corresponding pipelined manner for deciphering multiple network traffic flows at the same time.

In one embodiment, the apparatus is disposed on a single integrated circuit.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention. Further, the description repeatedly uses the phrase "in one embodiment", which ordinarily does not refer to the same embodiment, although it may.

Overview

Figure 1:
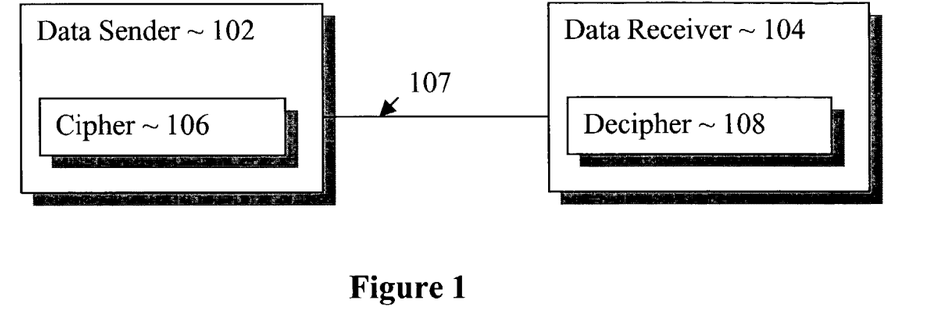
FIG. 1 illustrates an overview of the present invention.

Referring now to FIG. 1, wherein an overview of the present invention is illustrated. As shown, data sender 102 and data receiver 104 are coupled to each other via communication link 107, over which data sender 102 may send data, including data in ciphered form, to data receiver 104. Data sender 102 is equipped with cipher function 106. More importantly, data receiver 104 is equipped with decipher function 108 incorporated with the decipher teachings of the present invention. As will be described in more detail below, in accordance with the present invention, decipher function 108 incrementally deciphers a ciphered text received from data sender 102 employing a number of deciphering round keys advantageously generated in a pipelined manner on an as needed basis. The ciphered text is assumed to be generated by cipher 106 in an incremental manner, employing a number of ciphering round keys (which may also be generated in a pipelined manner). Cipher 106 includes in particular a transformation unit having a number of substitution boxes and complementary operational elements employed in the iterative generation of the ciphering round keys. A number of substitution values are stored in the substitution boxes. Decipher function 108 is accordingly equipped with a similar transformation unit having similar substitution boxes and related complementary operational elements. The substitution boxes also having similar or substantially the same substitution values, representing the same function, transforming the inverse of an input value, thereby enabling decipher function 108 to generate the deciphering round keys in the desired pipelined manner. As a result, the amount of delay before deciphering can start, as well as the amount of storage required to hold the relevant deciphering round keys at any one point in time are advantageously reduced.

Except for the decipher teachings of the present invention incorporated in decipher function 108 of data receiver 104, data sender 102, data receiver 104 and communication link 107 are all intended to represent a broad range of data sending, data receiving and communication systems and/or components known in the art. Accordingly, except for the deciphering teachings incorporated, these elements will not be otherwise further described.

Cipher and Decipher Functions

Figure 2:
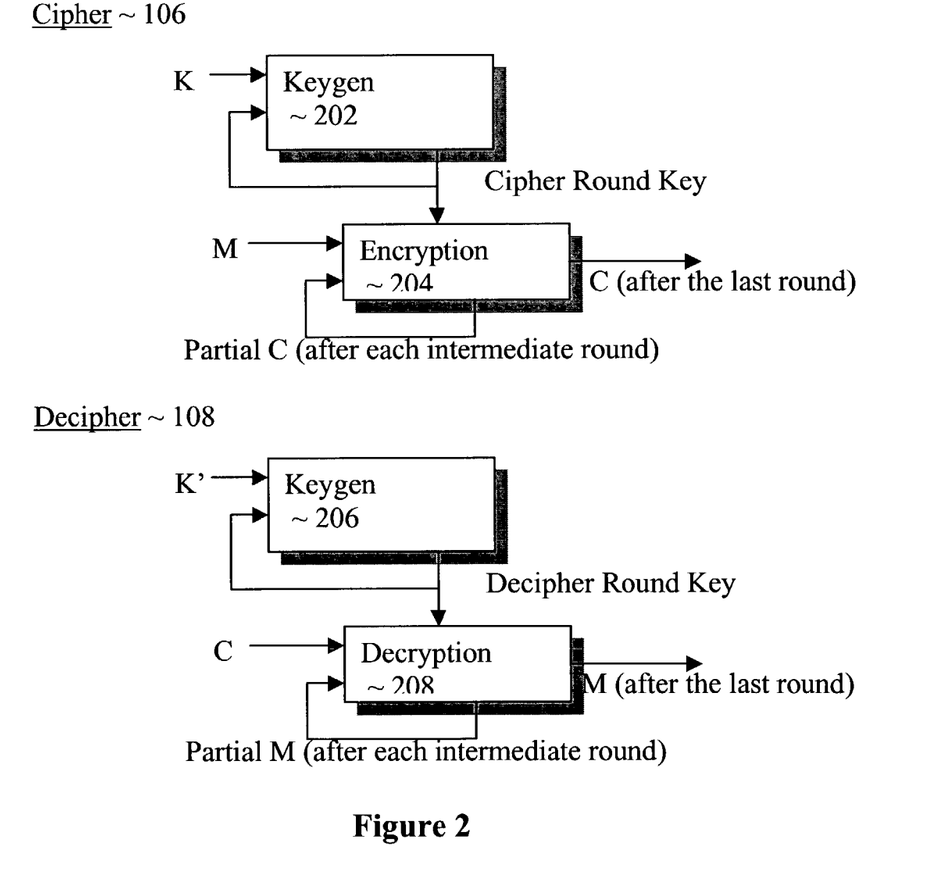
FIG. 2 illustrates the ciphering and deciphering units of FIG. 1 in further detail, in accordance with one embodiment.

FIG. 2 illustrates cipher function 106 and decipher function 108 of FIG. 1 in further details, in accordance with one embodiment. As illustrated, cipher function 106 includes cipher round key generation unit 202 and encryption function 204 coupled to each other as shown. Cipher round key generation unit 202 is employed to successively generates a number of ciphering round keys in real time in a pipelined and as needed manner, based off provided ciphering "master" key K. Encryption function 204 is employed to incrementally encrypt or cipher plain text M, using the generated ciphering round keys as they are successively made available. More specifically, ciphering round key generation unit 202 generates the next ciphering round key required by encryption unit 204, while encryption unit 204 is incrementally ciphering the plain text M or an partially ciphered text for another round using the previously generated ciphering round key. In other words, ciphering round key generation unit 202 generates the first ciphering round key based off the provided ciphering "master" key K, and provides the first generated ciphering round key to use to incrementally cipher plain text M. Thereafter, while encryption unit 204 incrementally ciphers plain text M for one round, ciphering round key generation unit 202 generates the next ciphering round key. Upon completion of the first ciphering round, encryption unit 204 incrementally ciphers the partially ciphered text for another round, while ciphering round key generation unit 202 generates yet another next ciphering round key. The process continues until the required number of rounds have been performed, with ciphering round key generation unit 202 generating the "last" ciphering round key, and thereafter, encryption function 204 incrementally ciphers the partially ciphered text for one last round, producing the ciphered text C.

Ciphering round key generator 202 includes in particular certain transformation means employed in the pipelined process of the present invention for pipelined generation of the ciphering round keys, conditionally transforming an input data word at each iteration (to be described more fully below). Encryption unit 204 on the other hand is intended to represent a broad range of encryption elements known in the art. Accordingly, except for the manner encryption unit 204 cooperates with ciphering round key generator 202, encryption unit 204 will not be further described.

Also as shown, decipher function 108 is similarly constituted. Decipher function 108 includes decipher round key generation unit 206 and decryption function 208 coupled to each other as shown. Decipher round key generation unit 206 is employed to successively generate a number of deciphering round keys in real time in a pipelined and as needed manner, based off provided deciphering "master" key K' (which is the bottom $N_k$ words of the data words of the ciphering round keys employed to generate ciphered text). Decryption function 208 is employed to incrementally decrypt or decipher ciphered text C, using the generated deciphering round keys as they are successively made available. More specifically, deciphering round key generation unit 206 generates the next deciphering round key required by decryption unit 208, while decryption unit 208 is incrementally deciphering the ciphered text C or a partially deciphered text for another round using the previously generated deciphering round key. In other words, deciphering round key generation unit 206 generates the first deciphering round key based off the provided deciphering "master" key K', and provides the first generated deciphering round key to use to incrementally decipher ciphered text C. Thereafter, while decryption unit 208 incrementally deciphers ciphered text C for one round, deciphering round key generation unit 206 generates the next deciphering round key. Upon completion of the first deciphering round, decryption unit 208 incrementally deciphers the partially deciphered text for another round, while deciphering round key generation unit 206 generates yet another next deciphering round key. The process continues until the required number of rounds have been performed, with deciphering round key generation unit 206 generating the "last" deciphering round key (i.e. the first ciphering round key), and thereafter, decryption function 208 incrementally deciphers the partially deciphered text for one last round, reproducing the original plain text M.

Deciphering round key generator 206 includes in particular the same (or functionally equivalent) transformation means employed by ciphering round key generator 202 to generate the ciphering round keys. In like manner, deciphering round key generator 206 employs the transformation means in the pipelined process of the present invention for generating the deciphering round keys in a pipelined manner, transforming an input data word at each iteration (also to be described more fully below). Decryption unit 208 is also intended to represent a broad range of decryption elements known in the art. Accordingly, except for the manner decryption unit 208 cooperates with deciphering round key generator 206, decryption unit 208 will not be further described either.

Ciphering and Deciphering Round Key Generators

Figure 3A:
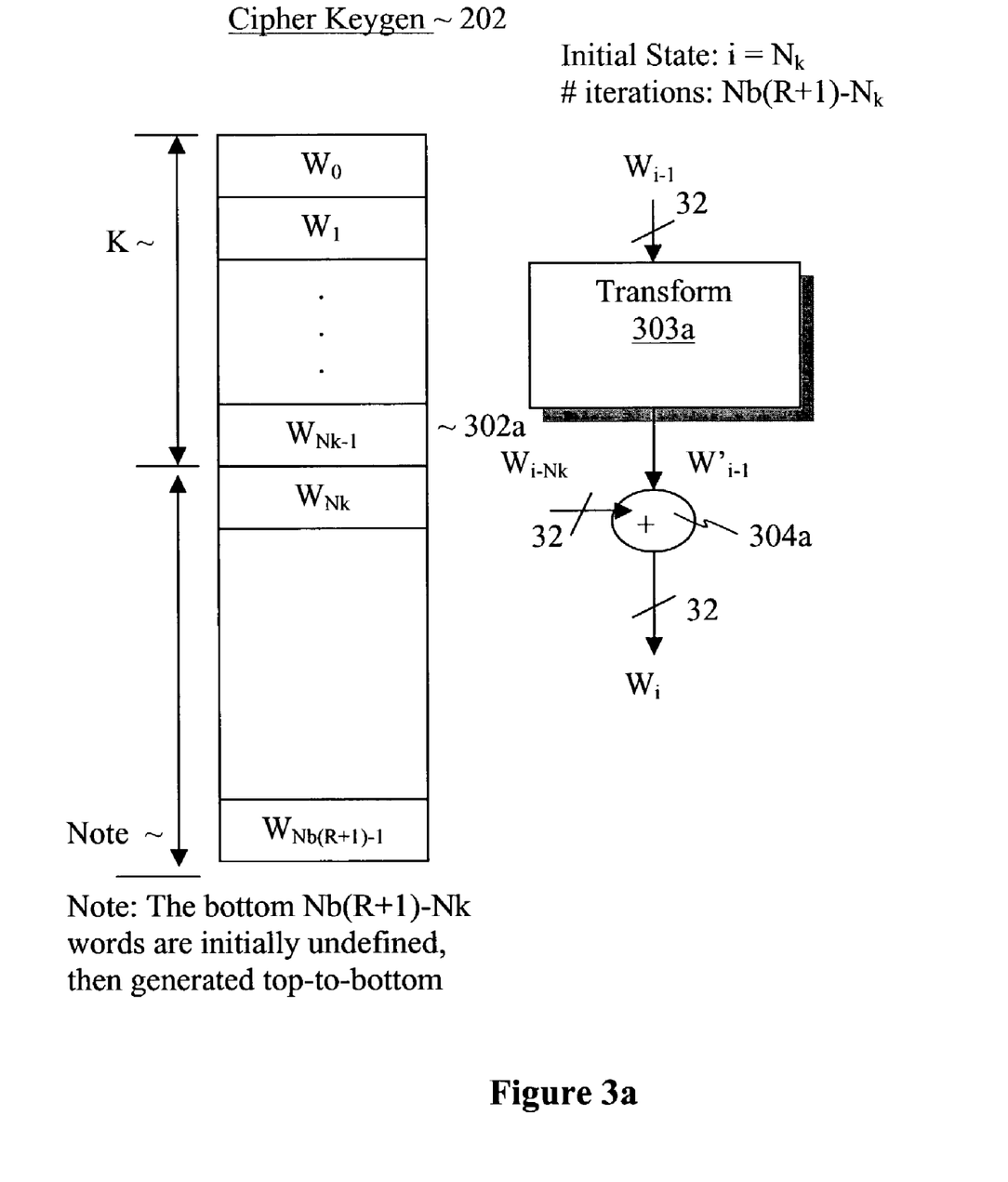
FIGS. 3a-3b illustrates the ciphering and deciphering round key generation units of FIG. 2 in further detail, in accordance with one embodiment.
Figure 3B:
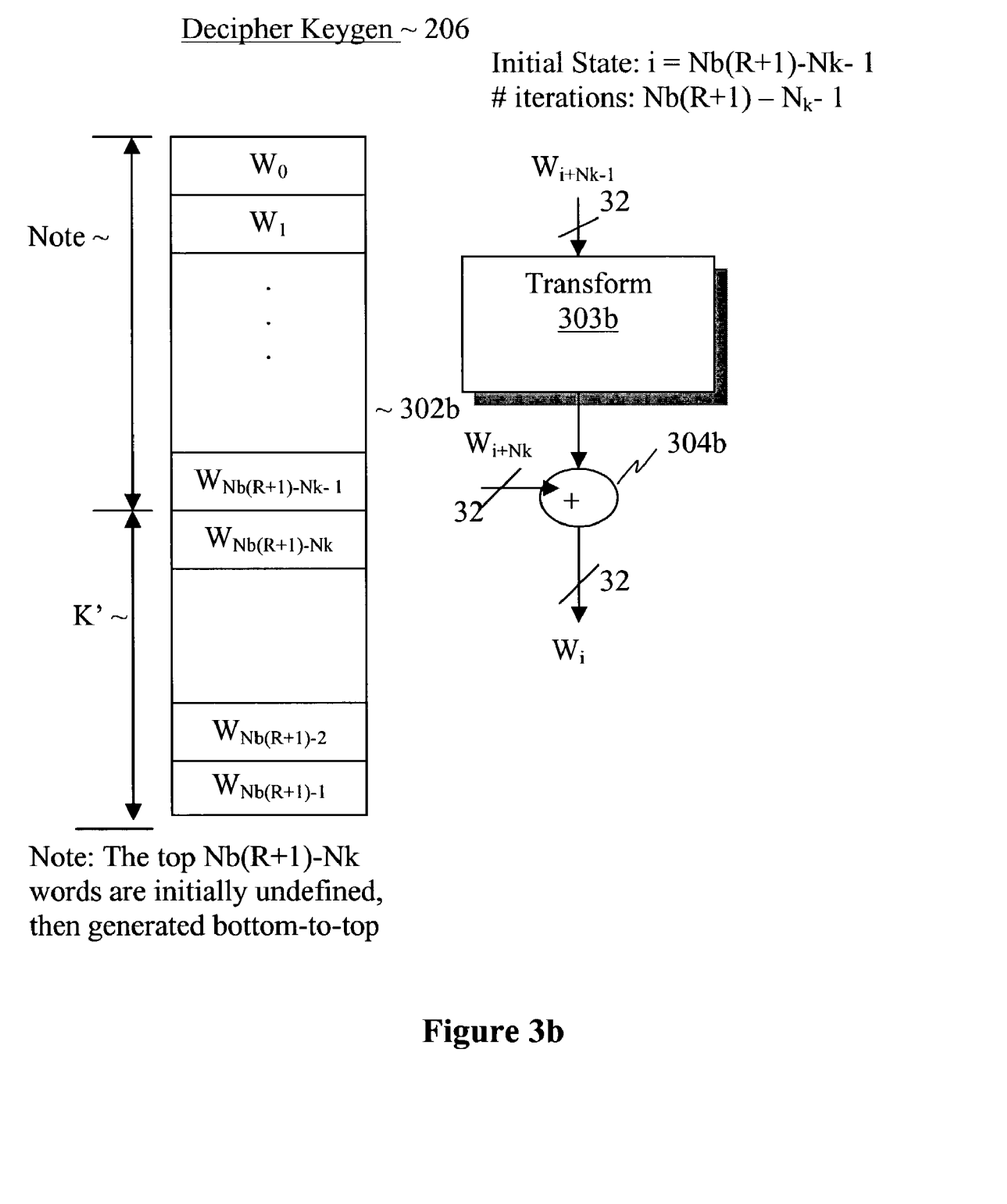

FIGS. 3a-3b illustrate one embodiment each of ciphering round key generator 202 and deciphering round key generator 206 of FIG. 2 in further details, in accordance with one embodiment. As illustrated in FIG. 3a, for the embodiment, the ciphering "master" key is $N_k$ data words in length ($W_0$ through $W_{Nk-1}$) 302a, whereas each of the generated ciphering round keys is assumed to be $N_b$ data words in length (where $N_b$ may be less than, equal to, or greater than $N_k$ depending on the chosen plaintext block length and master key length). Further, each of the data word $W_1$ is q bits wide, e.g. 32 bits.

The ciphering master key K provides the top $N_k$ words. Thus, if $N_b=N_k$, the first ciphering round key is the ciphering master key K; and generation of the rest of ciphering round keys starts with the first data word of the second ciphering round key. If $N_b>N_k$, the first $N_k$ data words of the first ciphering round key is provided by the ciphering master key K; and generation of the rest of ciphering round keys starts with the $N_{k+1}$ data word of the first ciphering round key. If $N_b<N_k$, the first ciphering round key is provided by the first $N_b$ data words of the ciphering master key K; generation of the rest of ciphering round keys starts with the $N_{Nk-Nb+1}$ data word of the second ciphering round key (assuming $2N_b<N_k$, otherwise, the second ciphering round key is provided by the $N_{b+1}$ to $N_{2b}$ data words of the ciphering master key K, and so forth).

Thus, upon "consuming" the ciphering master key K, ciphering round key generation unit 202 in general, generates each of the subsequent ciphering round key by iteratively generating its $N_b$ data words over $N_b$ iterations (except for the "partial" situations described earlier). That is, the $N_b$ data words of the $n^{th}$ ciphering round key are generated by iteratively generating data words $W_{(n-1)Nb}$ through $W_{nNb-1}$ over $N_b$ iterations.

As illustrated, for the embodiment, ciphering round key generation unit 202 includes conditional transformation unit 303a, and XOR function 304a, coupled to each other as shown. Conditional transformation unit 303a is employed to conditionally transform the last generated round key data word ($W_{i-1}$), for each of the round key data word generation iterations of the ciphering round key generation process for generating a ciphering round key. XOR function 304a is employed to generate the next round key data word ($W_i$) for each of the round key data word generation iterations of the ciphering round key generation process for generating a ciphering round key. XOR function 304a generates each next round key data word ($W_i$) by performing an XOR operation on the conditionally transformed last generated round key data word ($W_{i-1}$) and a predecessor round key data word of $N_k$ data words earlier ($W_{i-Nk}$), i.e. a predecessor round key data word with a predecessor distance of the length of the ciphering "master" key.

Thus, for an embodiment with (R+1) ciphering round keys, with each ciphering round key being $N_b$ words long, a total of $N_b(R+1)-N_k$ iterations are performed to successively generate the (R+1) ciphering round keys.

Similarly, for deciphering round key generation unit 206, as illustrated in FIG. 3b, for the embodiment, the deciphering "master" key K' is $N_k$ data words long ($W_{Nb(R+1)-Nk}$ through $W_{Nb(R+1)-1}$) 302b, whereas each of the generated deciphering round keys is $N_b$ data words in length. Further, each of the data word $W_i$ is also q bits wide, e.g. 32 bits. The first $N_k$ data words of the deciphering round keys are provided by the deciphering "master" key K'. Again, depending on whether $N_b$ is equal to, greater than or less than $N_k$, generation of the data words of the deciphering round keys starts with the first data word of the second deciphering round key, the $N_{k+1}$ data word of the first deciphering round key, or the $N_{nk-nb+1}$ data word of the second ciphering round key (again assuming $2N_b<N_k$). In general, upon "consuming" the data words of the deciphering master key, deciphering round key generation unit 206 in general generates each of the subsequent deciphering round keys by iteratively generating its $N_b$ data words over $N_b$ iterations (except for the "partial" situations described).

As illustrated, for the embodiment, deciphering round key generation unit 206 includes conditional transformation unit 303b, and XOR function 304b, coupled to each other as shown. Conditional transformation unit 303b is similarly employed to conditionally transform a predecessor round key data word of $N_k$ data words earlier (the length of the ciphering "master" key) ($W_{i+Nk-1}$), for each of the round key data word generation iterations of the deciphering round key generation process for generating a deciphering round key. XOR function 304b is employed to generate the next round key data word ($W_i$) for each of the round key data word generation iterations of the deciphering round key generation process for generating a deciphering round key. XOR function 304b generates each next round key data word ($W_i$) by performing an XOR operation on $W'_{i+Nk-1}$ (the conditionally transformed predecessor round key data word) and $W_{i+Nk}$ (the round key data word that $W_{i+Nk-1}$ 'immediately follows'). The phrase "immediately following" refers to the order of the round key data words are generated, also referred to as a "bottom to top" order of generation (see FIG. 3b).

Thus, for an embodiment with (R+1) deciphering round keys, with each ciphering round key being $N_b$ words long, a total of $N_b(R+1)-N_k$ iterations are performed to successively generate the (R+1) deciphering round keys.

Thus, it can be seen from the above description, deciphering may start as soon as the first deciphering round key is generated. Further, the amount of storage requirement needed for holding the relevant deciphering round key data words may be as little as the greater of $N_K+1$ or $N_b+1$ data words (depending on whether $N_k$ or $N_b$ is greater.

Transformation Unit

Figure 4:
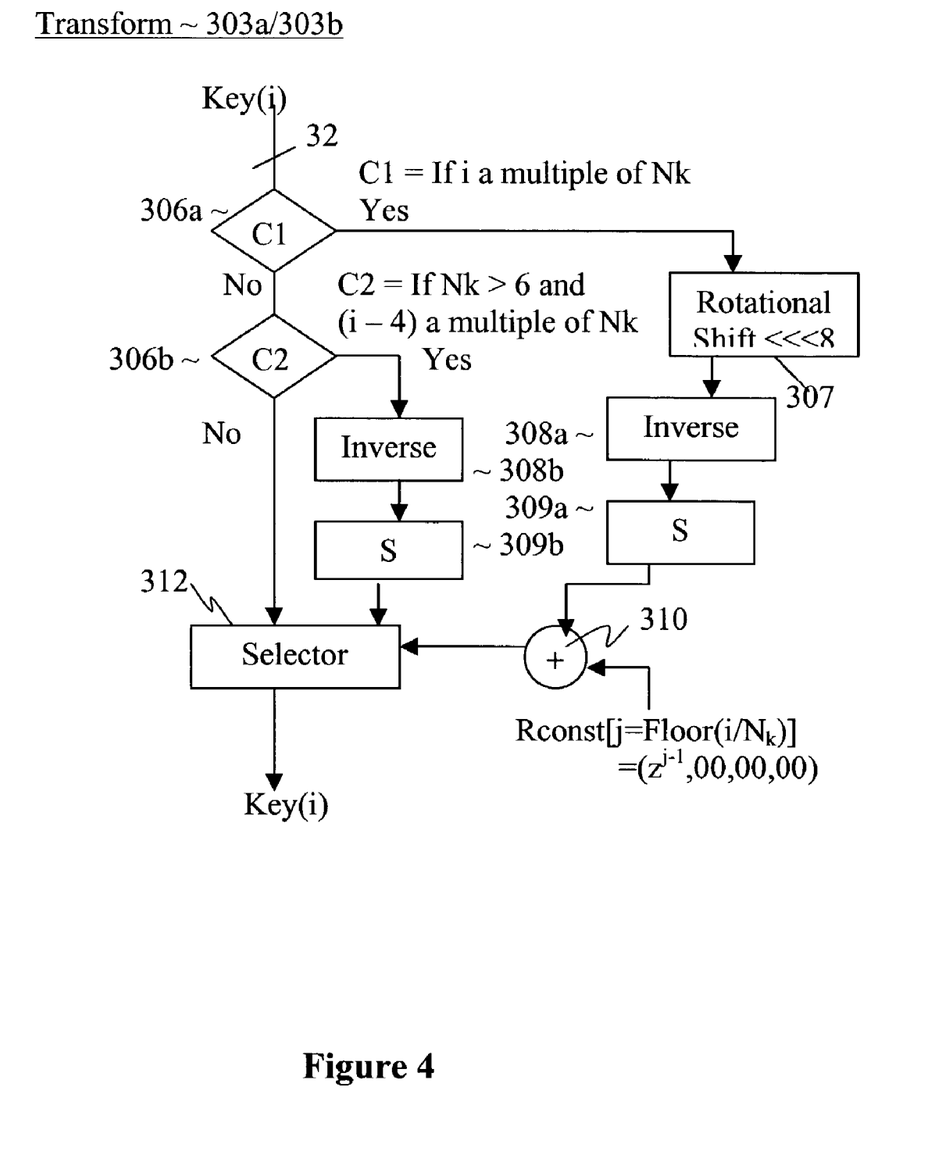
FIG. 4 illustrates the transformation unit of FIGS. 3a-3b in further detail, in accordance with one embodiment.

FIG. 4 illustrates transformation unit 303a/303b of ciphering/deciphering round key generator 202/206 of FIG. 3 in further detail, in accordance with one embodiment. As described earlier, transformation unit 303a/303b conditionally transforms an input data word to be employed in the generation of the next round key data word of a ciphering/deciphering round key. As illustrated, transformation unit 303a/303b includes conditional passthru circuitry 306a and 306b, inverse lookup table 308a and 308b, substitution boxes 309a and 309b, rotational shift register 307, XOR function 310, and selector 312, coupled to each other as shown.

Conditional passthru circuitry 306a-306b conditionally routes an input data word ($W_{i-1}$ in the case of ciphering, and $W_{i+Nk-1}$ in the case of deciphering) to one of three transformation paths, to be transformed zero or more times, depending on at least the multiplicity between the iteration index i and the deciphering master key length ($N_k$), to be described in more detail below.

Rotational shift register 307 is part of the transformation path that transforms the input data word multiple times. Specifically, it is employed on the "yes" path of passthru circuitry 306a to rotate the input data word in a predetermined direction for a predetermined number of bits. For the illustrated embodiment, the predetermined direction is rotation to the "left" (towards the MSB) and the predetermined number of bits is 8. In alternate embodiments, other quantities of rotation as well as rotation to the right (towards the LSB) may be practiced instead.

For the illustrated embodiment, the inverse lookup circuitry and substitution box pairs 308a and 309a, and 308b and 309b, are disposed on two transform paths providing one and multiple transformations to the input data word (on a byte basis) respectively. Each inverse lookup circuitry 308a/308b looks up the inverse of a byte of the input data word. In one embodiment, the inverse values are pre-computed e.g. by computing the multiplicative inverse of $GF(2^8)$ modulo the binary polynomial of 0×11B (where 0×00(zero) is defined as its own inverse). In alternate embodiments, the inverse values may be computed in real time. Each substitution box 309a/309b is an 8×8 substitution box containing a number of predetermined substitution values to be applied to each byte of an input data word. The manner in which the substitution values may be determined is described in more detail below.

When routed along the "yes" path of passthru circuitry 306a, the input data word, upon rotation (using rotational shift unit 307), is transformed using the inverse transformation is applied on a byte by byte basis. That is, the transformation is applied to each byte independently. The twice transformed input data word is further transformed by XOR function 310, performing an XOR operation on the twice transformed input data word and a computational constant. The computational constant is looked up from a look up table (not shown) having values ($z^{j-1}$, 00, 00, 00), where j is the look up index, and equals to the floor value of dividing the iteration index i by $N_k$. Thereafter, the thrice transformed data word is provided to selector 312 for selection, which selects the thrice transformed data word if the transformations provided by the "yes" path of passthru circuitry 306a is to be applied.

When routed along the "yes" path of passthru circuitry 306b (and "no" path of passthru circuitry 306a), the input data word is transformed using the inverse lookup and substitution box pair 308b and 309b (on a byte by byte basis as earlier described). The transformed input data word is provided to selector 312 for selection, which selects the particular transformed data word if the transformation provided by the "yes" path of passthru circuitry 306b (and "no" path of passthru circuitry 306a) is to be applied.

When routed along the "no" path of passthru circuitry 306b (and "no" path of passthru circuitry 306a), the input data word is provided to selector 312 for selection (without transformation), which selects the particular untransformed data word if no transformation handling provided by the "no" path of passthru circuitry 306b (and no path of passthru circuitry 306a) is to be followed.

Each of these elements, conditional passthru circuitry 306a-306b, rotational shift register 307, inverse lookup circuitries 308a-308b, substitution boxes 309a-309b, XOR function 310, and selector 312 may be formed using any individual or combinations of combinatorial logic and/or storage elements known in the art. Further, other manners of transformation, in particular, non-byte basis transformation may be employed instead.

For the illustrated embodiment, the no transformation handling provided by the "no" paths of passthru circuitry 306a-306b is followed if the iteration index i is not a multiple of $N_k$ or $N_k$ is not greater than 6 or if $N_k$ is greater than 6 but the value of iteration index i minus 4 is not a multiple of $N_k$. If the iteration index i is a multiple of $N_k$, the transformations provided by the "yes" paths of passthru circuitry 306a are applied. On the other hand, if the iteration index i is not a multiple of $N_k$, but $N_k$ is greater than 6, and the value of the iteration index i minus 4. is a multiple of $N_k$, the transformation provided by the "yes" path of passthru circuitry 306b (and "no" path of passthru circuitry 306b) is applied.

Substitution Values Computation and Example Data Structure

As alluded to earlier, for the illustrated embodiment, each substitution box is 8×8 in size to be applied to each bye of a data word. In one embodiment, the substitution byte values of the substitution box may be determined as follows. Let $x_0 x_1 \ldots x_7$ and $y_0 y_1 \ldots y_7$ represent the corresponding 8 bits of the x input and y output values of the 8×8 embodiment. That is, the x input values are the selected byte outputs of the "inverse" lookup circuitry 308a/308b based on the input data word. Then x and y can be said to have affine relation of y=Ax+b, where operations are computed mode 2, and where A and b are given by $$A = \begin{bmatrix} 10001111 \\ 11000111 \\ 11100011 \\ 11110001 \\ 11111000 \\ 01111100 \\ 00111110 \\ 00011111 \end{bmatrix} \quad b = \begin{bmatrix} 1 \\ 1 \\ 0 \\ 0 \\ 0 \\ 1 \\ 1 \\ 0 \end{bmatrix}$$

Figure 5:
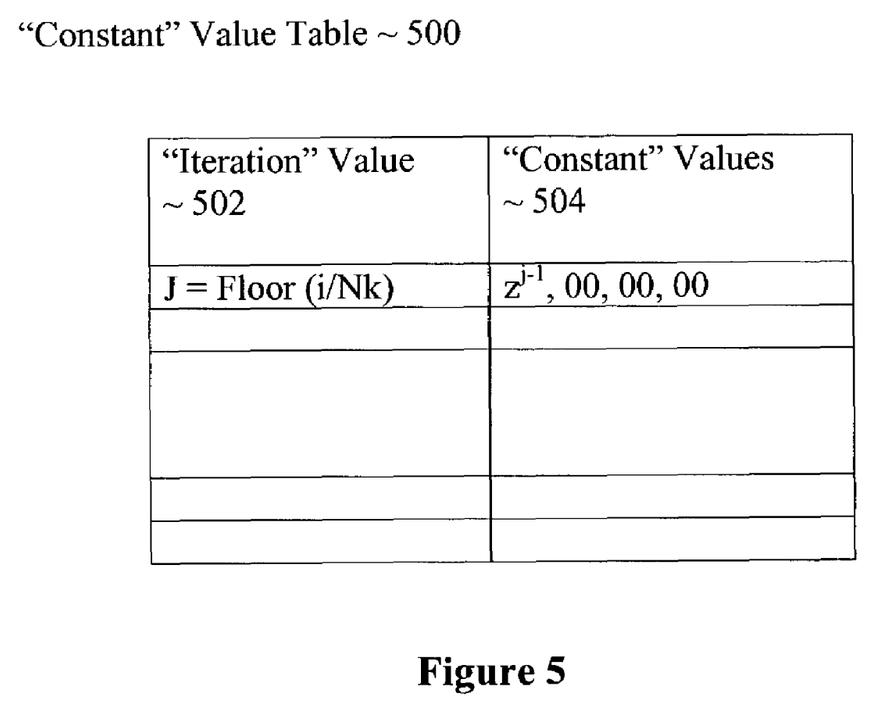
FIG. 5 illustrates an example data organization for the constant values of FIG. 4, in accordance with one embodiment.

FIG. 5 illustrates a look up table suitable for use to implement the look up tables for storing the Rconst values of FIGS. 3a-3b. As illustrated, the desired iteration index dependent computational values, for efficient of operation, may be pre-computed and stored into example lookup table 500 comprising at least two columns 502 and 504. Column 502 is employed to store the computed input value, which as described earlier is equal to the floor value of dividing the iteration index i by $N_k$ (the number of data words in the ciphering "master" key). Column 504 is employed to store the output values ($z^{j-1}$, 00, 00, 00). $z^{j-1}$ is an element of $GF(2^8)$.

In one alternate embodiment (where transformation is performed on a byte by byte basis), z is set to 2, and Rconst is dynamically generated instead. The left most byte of Rconst is generated by left shifting the constant 1 (the other bytes of Rconst are zero). That is, the left most byte of the jth constant is given by (1<<j), where the symbols "<<" stand for left shifting, and (1<<j) means left shift by j bits. (Accordingly, in this alternate embodiment, the lookup table illustrated in FIG. 5 is not needed.)

Example Application

Figure 6:
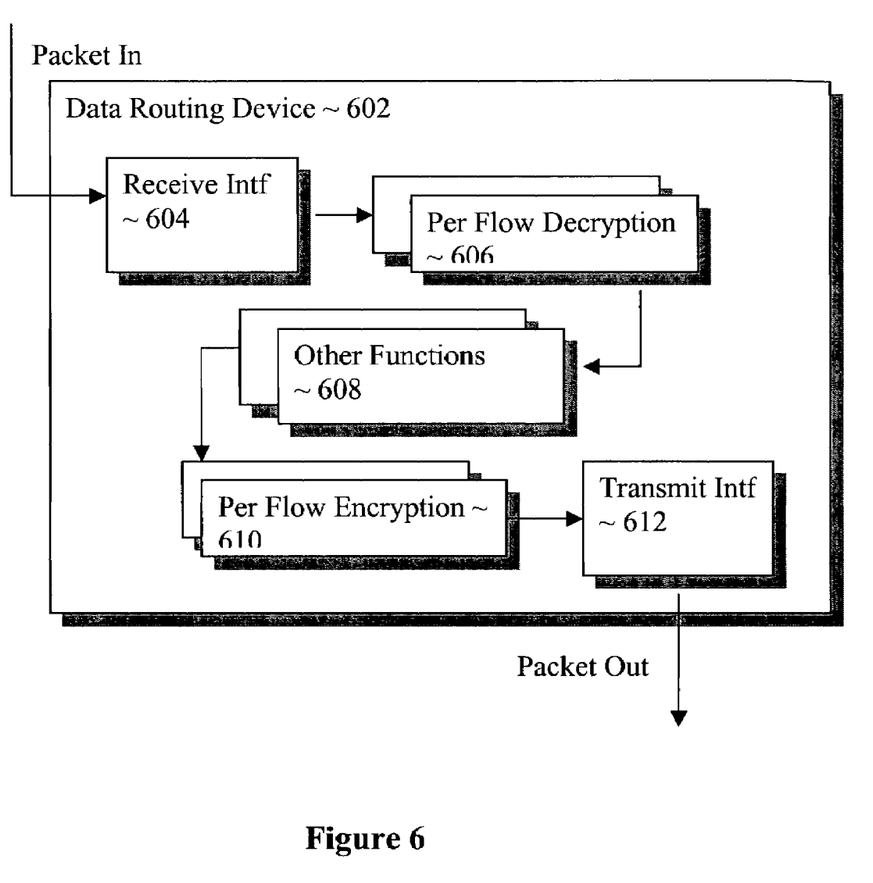
FIG. 6 illustrates an example routing device incorporated with the deciphering teaching of the present invention.

FIG. 6 illustrates an example application of the present invention. As illustrated, data routing device 602 comprising receive interface 604 and transmit interface 612 is advantageously provided with a number of decryption functions 606 and a number of encryption functions 610. Additionally, data routing device 602 may also include a number other function units 608. Decryption functions 606 and encryption functions 610 are provided to perform decryption and encryption for a number of network traffic flows, one each for a network traffic flow. More importantly, decryption functions 606 and encryption functions 610 are incorporated with the teachings of the present invention, enabling them to advantageously generate the deciphering/ciphering round keys in a pipelined and as needed manner. The deciphering master keys (K') of the different decryption functions 606 for the different network traffic flows may be the same, or different, or some are the same, while others are different. Likewise, the ciphering master keys (K) of the different encryption functions 610 for the different network traffic flows may be the same, or different, or some are the same, while others are different.

Typically, the K's and Ks are provided to data routing device 602 e.g. by a network administrator. Alternatively, the K's may be exchanged between data routing device 602 and another party who wants to engage in secured communication with data routing device 602. The provision may e.g. be made over secured channels (not shown). Of course, the K's are pre-generated from their corresponding Ks.

As described earlier, each of decryption functions 606 and encryption functions 610 may start decryption and encryption of the corresponding network traffic flow as soon as the first deciphering or ciphering round key is available (with or without having to be at least partially generated, as the case may be depending on the relative size of $N_b$ and $N_k$ as described earlier). Further, the amount of storage requirement for provisioning data routing device 602 to be able to handle the decryption and encryption of multiple network traffic flows at the same time is substantially reduced under the present invention. As a result of the storage requirement savings, data routing device 602 may be advantageously disposed on a single integrated circuit. Thus, together with the "fast start", data routing device 602 is able to handle high speed line rate data decryption and encryption for multiple data flows at the same time. In one embodiment, data routing device 602 is an IC component for routing packets transmitted over an optical medium onto an electrical medium at very high speed.

The advantages of data routing device 602 is most evident when the K's can be reused multiple times, such as in bulk encryption applications (e.g. SSH tools such as ssh and scp, or Secure Sockets Layer (SSL) services for secure web browser sessions) where many blocks of data need to be encrypted using the same key, sent securely, then decrypted.

CONCLUSION AND EPILOGUE

Thus, it can be seen from the above descriptions, a novel method and apparatus for deciphering ciphered text, in particular, having the required deciphering round keys generated in a pipelined manner on an as needed basis, has been described. While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In an apparatus, a method of operation comprising: generating in real time a first deciphering round key based on a deciphering key;
    incrementally deciphering a ciphered text for a first round using the real time generated first deciphering round key to generate a partially deciphered text;
    generating in real time a second deciphering round key based, at least in part, on said generated first deciphering round key while said incremental deciphering for said first round is being performed; and
    incrementally deciphering the partially deciphered text for a second round using the real time generated second deciphering round key.

2. The method of claim 1, wherein said first and second deciphering round keys comprise first and second plurality of round key data words respectively, and said generation in real time of said second deciphering round keys comprises iteratively generating said second plurality of round key data words over a plurality of iterations.

3. The method of claim 2, wherein said iterative generation of said second plurality of round key data words over a plurality of iterations comprises generating one of said second plurality of round key data words during each iteration, including performing first XOR operation on a first and a second round key data word during each iteration.

4. The method of claim 3, wherein said first round key data word employed in said first XOR operation during each iteration is a first predecessor round key data word of one deciphering master key length preceding said one of the second plurality of the round key data words to be generated, and said second round key data word employed is a conditionally transformed second predecessor round key data word immediately following the first predecessor round key data word.

5. The method of claim 4, wherein said second round key data word employed is an untransformed version of said second predecessor round key data word.

6. The method of claim 4, wherein said second round key data word employed is a substitution value looked up from a substitution box using an inverse of said second predecessor round key data word.

7. The method of claim 4, wherein said second round key data word employed is a thrice transformed version of said second predecessor round key data word generated by performing a second XOR operation on a twice transformed version of said second predecessor round key data word and a value that is functionally dependent on an iteration index value.

8. The method of claim 7, wherein said twice transformed version of said second predecessor round key data word is a value looked up from a substitution box using an inverse of a once transformed version of said second predecessor round key data word.

9. The method of claim 8, wherein said once transformed version of said second predecessor round key data word is generated by rotationally shifting said second predecessor round key data word in a predetermined shifting direction for a predetermined shifting amount.

10. An apparatus comprising:
a deciphering round key generator to successively generate in real time at least a first and a second deciphering round key based on a deciphering key; and
a deciphering unit coupled to the deciphering round key generator to success employ said real time successively generated deciphering round keys to incrementally decipher a ciphered text,
wherein said deciphering round key generator at least generates said second deciphering round key in real time while said deciphering unit deciphers said ciphered text employing said real time generated first deciphering round key.

11. The apparatus of claim 10, wherein said first and second deciphering round keys comprise first and second plurality of round key data words respectively, and said deciphering round key generator generates said second deciphering round keys in real time by iteratively generating said second plurality of round key data words over a plurality of iterations.

12. The apparatus of claim 11, wherein said deciphering round key generator comprises a first XOR function, and iteratively generates said second plurality of round key data words over a plurality of iterations by generating one of said second plurality of round key data words during each iteration, performing an XOR operation on a first and a second round key data word using said first XOR function.

13. The apparatus of claim 12, wherein said first round key data word employed in each iteration is a first predecessor round key data word of one deciphering master key length preceding said one of the second plurality of the round key data words to be generated, and said second round key data word is a conditionally transformed second predecessor round key data word immediately following said first predecessor round key data word.

14. The apparatus of claim 13, wherein said deciphering round key generator further comprises conditional passthru circuitry and transformation circuitry coupled to said first XOR function in parallel to provide said XOR function with an untransformed version or a one or more times transformed version of said predecessor round key data word, depending on at least multiplicity between an iteration index value and a deciphering master key length.

15. The apparatus of claim 14, wherein said deciphering round key generator further comprises a substitution box and an inverse lookup circuitry serially coupled to said passthru circuitry to substitute the second predecessor round key data word with a substitute value looked up using an inverse of said second predecessor round key data word.

16. The apparatus of claim 14, wherein said deciphering round key generator further comprises a second XOR function coupled to said passthru circuitry to perform a second XOR operation on an at least a once transformed version of said second predecessor round key data word and a value that is functionally dependent on an iteration index value.

17. The apparatus of claim 16, wherein said deciphering round key generator further comprises a lookup table coupled to said second XOR function and having stored therein said functionally dependent values to be looked up using a value that depends on a deciphering master key length and an amount of iteration performed.

18. The apparatus of claim 16, wherein said deciphering round key generator further comprises a substitution box and inverse lookup circuitry serially coupled to said second XOR function to provide the second XOR function with said at least once transformed version of said second predecessor round key data word, generated by substituting an inverse of an least once transformed version of said second predecessor round key data word with a substitute value.

19. The apparatus of claim 18, wherein said deciphering round key generator further comprises a rotational shifter coupled to said inverse lookup circuitry to provide said inverse lookup circuitry with said at least once transformed version of said second predecessor round key data word, generated by rotationally shifting the said second predecessor round key data word.

20. The apparatus of claim 10, wherein said apparatus is disposed on an integrated circuit.

21. A routing apparatus comprising:
a first deciphering round key generator to successively generate in real time at least a first and a second deciphering round key based, at least in part, on a first deciphering key for a first network traffic flow;
a first deciphering unit coupled to the first deciphering round key generator to successively employ said real time successively generated at least first and second deciphering round keys to incrementally decipher a first ciphered text for the first network traffic flow;
a second deciphering round key generator to successively generate in real time at least a third and a fourth deciphering round key based, at least in part, on a second deciphering key for a second network traffic flow; and
a second deciphering unit coupled to the second deciphering round key generator to successively employ said real time successively generated at least third and fourth deciphering round keys to incrementally decipher a second ciphered text for the second network traffic flow,
wherein said first deciphering round key generator at least generates said second deciphering round key in real time while said first deciphering unit deciphers said first ciphered text employing said real time generated first deciphering round key, and said second deciphering round key generator at least generates said fourth deciphering round key in real time while said second deciphering unit deciphers said second ciphered text employing said real time generated third deciphering round key.

22. The routing apparatus of claim 21, wherein said first, second, third and fourth deciphering round keys comprise first, second, third and fourth plurality of round key data words respectively, and said first and second deciphering round key generator generate said second and fourth deciphering round keys in real time by iteratively generating said second and fourth plurality of round key data words over a first and a second plurality of iterations, respectively.

23. The routing apparatus of claim 22, wherein each of said first/second deciphering round key generator comprises a first XOR function, and iteratively generates said second/fourth plurality of round key data words over a plurality of iterations, respectively, by generating one of said second/fourth plurality round key data words during each iteration, performing an XOR operation on a first and a second round key data word using said first XOR function.

24. The routing apparatus of claim 23, wherein said first round key data word employed in each iteration is a first predecessor round key data word of said second/fourth plurality of round key data words of one deciphering master key length preceding said one of the second/fourth plurality of the round key data words to be generated, and said second round key data word employed is a conditionally transformed second predecessor round key data word immediately following the first predecessor round key data word.

25. The routing apparatus of claim 23, wherein each of said first/second deciphering round key generator further comprises conditional passthru circuitry and transformation circuitry coupled to said first XOR function in parallel to provide said XOR function with an untransformed version or a one or more times transformed version of said second predecessor round key data word depending on at least multiplicity between an iteration index value and a deciphering master key length.

26. The routing apparatus of claim 25, wherein each of said first/second deciphering round key generators further comprises a substitution box and an inverse lookup circuitry serially coupled to said passthru circuitry to substitute the second predecessor round key data word with a substitute value looked up using an inverse of said second predecessor round key data word.

27. The routing apparatus of claim 25, wherein each of said first/second deciphering round key generators further comprises a second XOR function coupled to said passthru circuitry to perform a second XOR operation on an at least once transformed version of said second predecessor round key data word and a value that is functionally dependent on an iteration index value.

28. The routing apparatus of claim 27, wherein each of said first/second deciphering round key generators further comprises a lookup table coupled to said second XOR function and having stored therein said functional dependent values to be looked up using a value that depends on a deciphering master key length and an amount of iteration performed.

29. The routing apparatus of claim 27, wherein each of said first/second deciphering round key generators further comprises a substitution box and inverse lookup circuitry serially coupled to said second XOR function to provide the second XOR function with said at least once transformed version of said second predecessor round key data word, generated by substituting an inverse of an at least once transformed version of said second predecessor round key data word with a substitute value.

30. The routing apparatus of claim 29, wherein each of said first/second deciphering round key generators further comprises a rotational shifter coupled to said inverse lookup circuitry to provide said inverse lookup circuitry with said at least once transformed version of said second predecessor round key data word, generated by rotationally shifting said second predecessor round key data word.

31. The routing apparatus of claim 21, wherein said routing apparatus is disposed on an integrated circuit.

* * * * *